Sept. 20, 1971    J. M. WHITE ET AL    3,605,467
ROLLING OF TAPERED GEARS
Filed Oct. 30, 1969    2 Sheets-Sheet 1
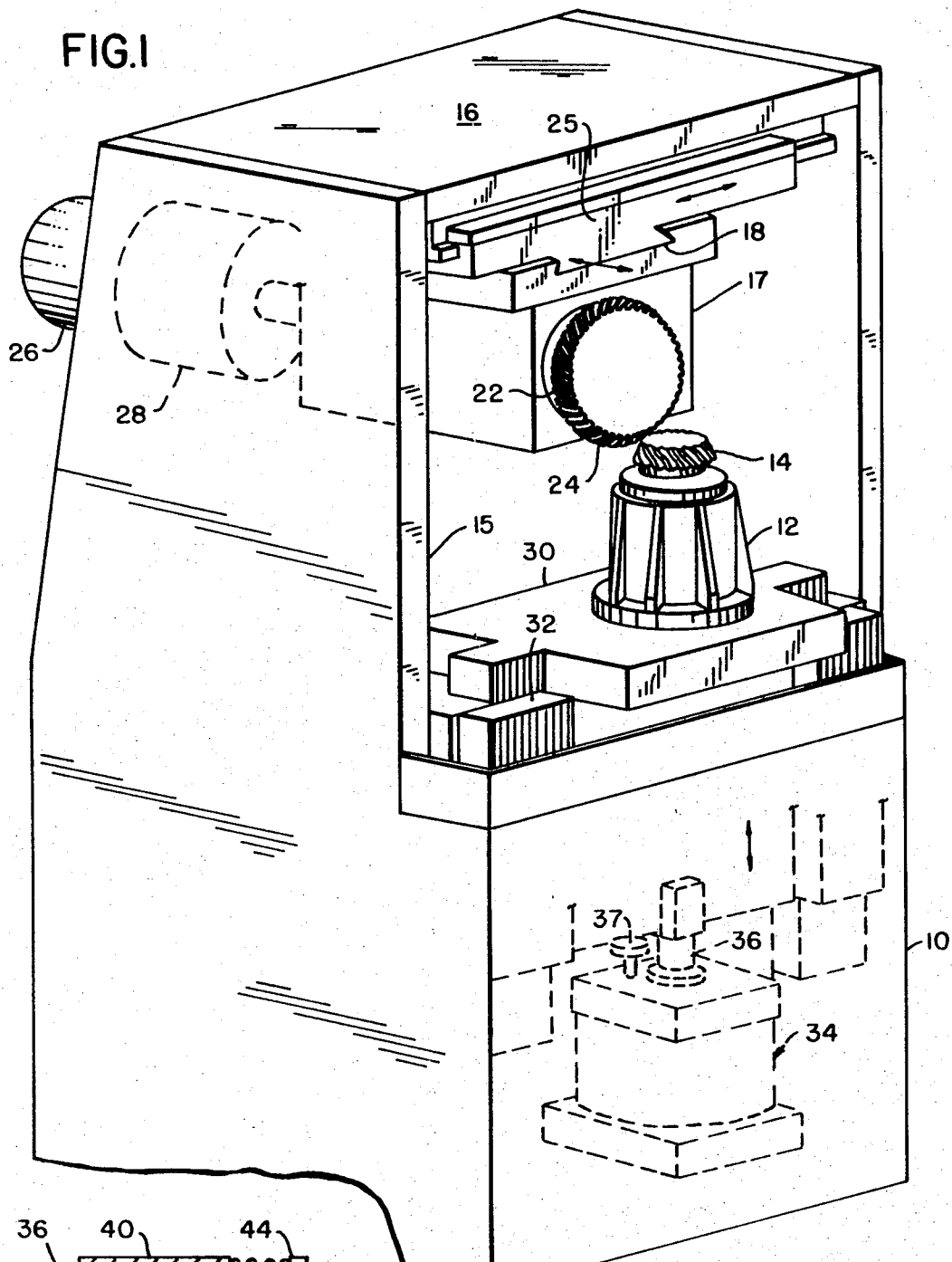
INVENTORS
JOHN M. WHITE
RICHARD W. TERSCH
BY RAYMOND S. KUSZ
Whittemore, Hulbert
& Belknap ATTORNEYS

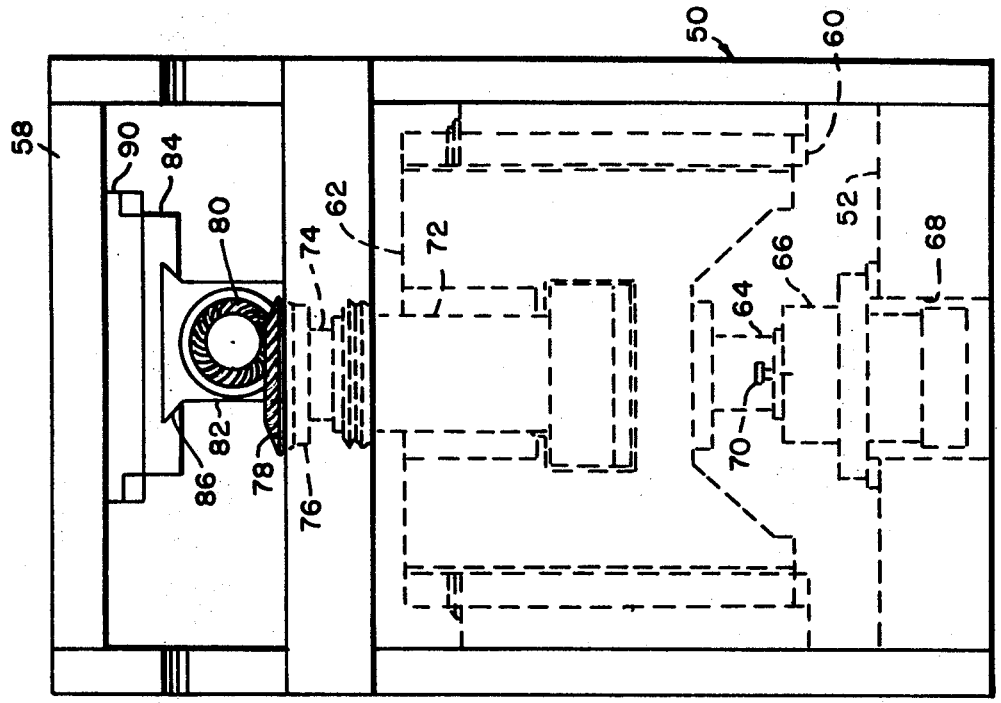
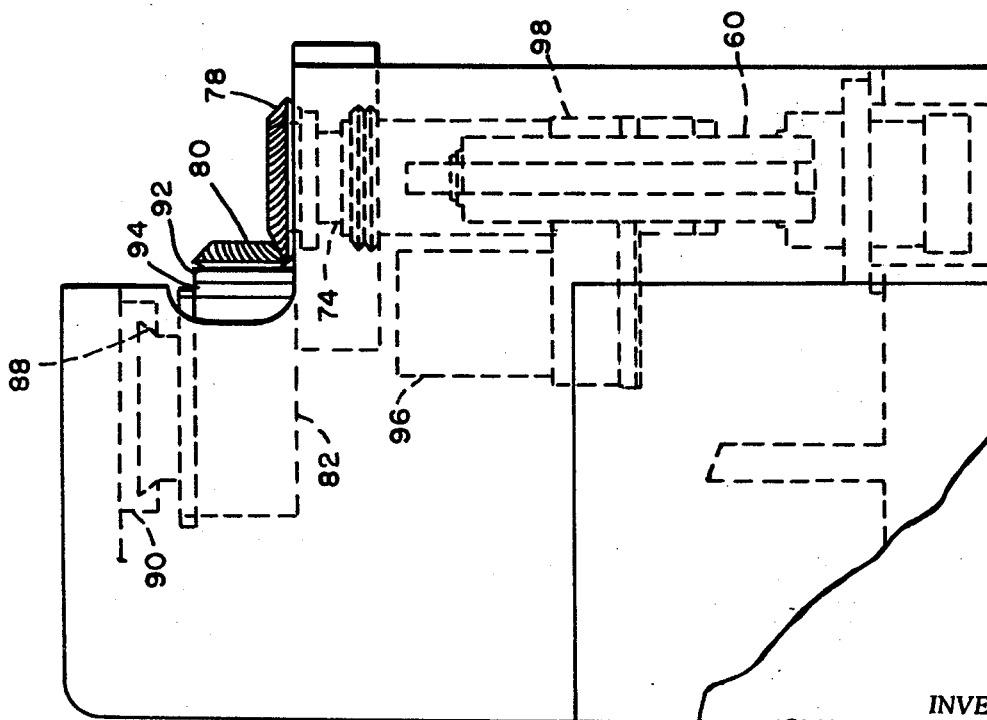

United States Patent Office 3,605,467
Patented Sept. 20, 1971

3,605,467
ROLLING OF TAPERED GEARS
John M. White and Richard W. Tersch, Grosse Pointe Woods, and Raymond S. Kusz, Mount Clemens, Mich., assignors to Lear Siegler, Inc., Santa Monica, Calif.
Filed Oct. 30, 1969, Ser. No. 872,691
Int. Cl. B21d 53/28
U.S. Cl. 72—84
11 Claims

ABSTRACT OF THE DISCLOSURE

A machine for finish rolling rough cut tapered gears such as hypoid gears, comprising means for meshing a tool or die in the form of a hypoid ring gear with a hypoid pinion in properly meshed relation, and establishing rolling pressure between the die and pinion by effecting advance of the die or pinion in a direction parallel to its axis.

CROSS-REFERENCE TO RELATED APPLICATION

The gear rolling apparatus is closely related to apparatus shown in Motz et al. application, Ser. No. 872,692, filed of even date herewith.

SUMMARY OF THE INVENTION

The production of hypoid pinions as at present practiced is time-consuming and expensive because it is necessary to take three separate cuts to produce the required form of teeth. The first of these cuts is a roughing cut which removes most of the material but leaves sufficient stock so that the opposite sides of the teeth may be finish cut in separate cutting operations. It has proved impractical if not impossible, to finish cut both sides of a hypoid pinion in a single cutting operation, due to the difference in form and action of these tooth surfaces.

In accordance with the present invention a rolling die is produced in the form of a hypoid ring gear conjugate to the final desired form of the hypoid pinion. The die and pinion are supported in mesh for relative movement in a direction parallel to the axis of the die. While the pinion and ring gear die are rotated by direct rotation of either, but preferably the ring gear, pressure is applied tending to move the pinion in a direction parallel to its axis to establish rolling pressure between the teeth of the die and the teeth of the pinion.

This operation may be carried out with satisfactory results with the pinion at room temperature. Sufficient pressure is applied to displace a few thousandths of an inch of material at the sides of the teeth of the pinion so as to reduce tooth thickness and to bring the profiles at both sides of the teeth of the pinion into the form which is properly conjugate to the tooth form of the hypoid ring gear.

BRIEF DESCRIPTION OF THE DRAWING

FIG. 1 is a perspective view of apparatus for carrying out the present invention.

FIG. 2 is a fragmentary sectional view of a component of the machine.

FIG. 3 is a front elevation of a somewhat different embodiment of the invention.

FIG. 4 is a side elevation of the machine illustrated in FIG. 3.

DETAILED DESCRIPTION

Referring now to the drawings, the machine comprises a base 10 which is provided with a live spindle construction 12 for supporting a work piece 14 in the form of a hypoid pinion for free rotation. The live spindle includes bearing structure capable of supporting the pinion firmly against lateral thrusts developed during the gear finishing operation.

Base 10 includes side plates 15, and top plate 16 mounting an adjustable slide 17 movable longitudinally thereon by ways indicated generally at 18. The slide includes a spindle (not shown) having an external fixture 22 adapted to mount a die 24 for rotation. The die 24 is in the form of a hypoid ring gear.

A cross slide 25 is provided for effecting adjustment of the slide 17 in a horizontal plane perpendicular to the axis of the spindle supporting the die 24 to accommodate different hypoid gear sets.

Means are provided for effecting positive rotation of the ring gear 24 and this means comprises a motor 26. Preferably, the motor 26 is a hydraulic motor to permit frequent reversal where this is found necessary in carrying out a program of rolling a series of hypoid pinions. Alternatively of course, the motor 26 may be electric, particularly where the rolling operation is carried out without reversal in direction of rotation. In any case, the motor 26 is connected to the spindle carrying the tool fixture 22 by suitable transmission (not shown) included within a transmission housing 28.

In order to provide a depth feed which develops the working pressure between the teeth of the die and pinion, the spindle construction is carried by a vertically movable work slide 30 guided by ways indicated diagrammatically at 32. A hydraulic piston and cylinder device 34 is provided beneath the work slide 30 including a piston rod 36 connected to slide 30 to move the slide upwardly to a limiting position determined by adjustable stop means indicated diagrammatically as an abutment screw 37 engageable by the piston of device 34.

The operation may if desired be carried out automatically, in which case suitable automatic loading and unloading means are provided for feeding rough cut pinions 14 to the spindle 12 and for removing the rolled pinion after the rolling operation has taken place. In such case it is normally desirable to actuate the piston and cylinder mechanism so as to withdraw the work support 12 completely from the zone in which it meshes with the die to facilitate loading. Thereafter, fluid pressure is supplied to the piston and cylinder device 34 to urge the pinion toward and into meshing relation with the die. In the event that the teeth of the die and pinion do not mesh on initial contact, it is desirable to provide a yielding connection in the piston rod 36 which may take the form of the housing 40 attached thereto as seen in FIG. 2, engaging a spring 42 acting against a head 44 connected to the piston rod extension 46 which is connected to the slide 17. The end of the piston rod 36 in this case is spaced from the head 44 of the piston rod extension 46, by the spring 42 as the die and pinion engage. After the meshing engagement between the teeth of the die and pinion has been assured, further movement of the piston rod 36 collapses the spring 42 and working pressure is applied directly from the piston rod 36 to its extension 46.

In general, the position of the abutment 37 will be such as to permit the pinion 14 to move to a position in which the teeth of the pinion assume the required shape after the rolling pressure of the die has been removed.

Referring now to FIGS. 3 and 4 there is illustrated a second embodiment of the present invention. In these figures the machine comprises a frame indicated generally at 50 including a heavy bottom plate 52, side plates 54 and 56, and a top plate 58.

Mounted on vertical ways indicated at 60 is a vertical slide 62 connected to a piston rod 64 extending from a hydraulic cylinder 66 which is mounted in an opening 68 formed in the bottom plate 52. Suitable means are provided for adjustably limiting upward movement of the piston rod 64 and this means is diagrammatically indicated in FIG. 3 as comprising an abutment screw 70 extending into the cylinder 66, the inner end of the screw constituting an abutment for the piston movable therein.

Mounted in the slide 62 is a spindle housing 72 having a vertical spindle 74 therein carrying at its upper end a fixture 76 for carrying either a rolling tool in the form of a hypoid gear or a hypoid pinion to be rolled by the die.

In use of the machine as illustrated in FIG. 3, fixture 76 is shown as carrying the hypoid die 78 in mesh with the work pinion 80. The pinion 80 is carried by a block 82 mounted in an intermediate plate 84 by means of ways indicated at 86 for adjustment in a direction parallel to the axis of the pinion 80. The intermediate plate 84 is in turn mounted in ways indicated at 88 for adjustment in a fixed support plate 90 in a horizontal direction perpendicular to the axis of the pinion 80. The pinion 80 is carried for free rotation by an adapter plate 92 which in turn is carried by the freely rotatable spindle 94.

Means are provided for rotating the spindle 74 and this means comprises a motor 96, preferably a variable speed hydraulic motor, which is connected through suitable reduction gearing (not shown) contained in a transmission housing 98 which in turn connects to a gear carried by the spindle 74.

With this arrangement it will be apparent that the pinion 80 in use is mounted for free rotation in a fixed position. The rolling die 78 is mounted for vertical movement to establish rolling pressure between its teeth and the teeth of the pinion, and is in addition adapted to be driven in rotation. Rotation of the die 78 imparts rotation to the pinion 80.

In addition it will be observed that the location of the pinion 80 is adjustable in any direction in a horizontal plane as a result of the angularly related ways 86 and 88. The operating position of the die 78 is limited by means of the adjustment screw 70. Accordingly, it is possible to accommodate different size work gears and dies.

In both of the embodiments of the invention illustrated, it will be apparent that if desired the location of the rolling die and the work gear my be reversed. Similarly, the pinion 80 may constitute a die for rolling the teeth on the hypoid gear member 78.

The machines described in the foregoing are characterized by their extreme simplicity and the economy with which they may be produced and operated. Where the machine is specifically designed for performing a rolling operation on identical pinions, the only movements required of the machine are reciprocation of the slide 30 and of course the rotation of the spindles which, as illustrated, support the ring gear die 24 and the work pinion 14.

In the machines illustrated and described in the foregoing it will of course be apparent that the position of the pinion and ring gear may be exchanged and that in fact, either the pinion or the ring gear may constitute the tool for rolling the teeth of the mating member to a conjugate form.

It will also be understood that while the illustrated arrangement involves rolling of hypoid pinions or ring gears, the invention is not limited thereto, but is applicable to any tapered gear set such for example as bevel or spiral bevel gearing.

What we claim as our invention is:
1. Apparatus for finish rolling rough cut tapered gear or pinion members which comprises
    a frame,
    a vertically movable slide at one side of said frame,
    a rotatable vertical spindle on said slide having a support fixture at its upper end for supporting one of said members,
    a horizontally movable slide carried by said frame for movement in a direction radial of the axis of said vertical spindle,
    a horizontal spindle carried by said horizontal slide,
    an adjustable support carried by said frame for horizontal adjustment transversely of the axis of said horizontal spindle,
    ways on said adjustable support for adjusting said horizontal slide parallel to the axis of said horizontal spindle,
    rotary drive means connected to said one of said spindles for driving said one spindle in rotation, and
    feed means connected between said frame and said vertically movable slide for feeding said slide vertically to establish rolling pressure between the teeth of a pinion member on one of said spindles and a ring gear member on the other of said spindles, one of said members being a work piece and the other being a rolling die.
2. Apparatus as defined in claim 1 in which the pinion is a hypoid gear pinion and is carried by said vertical spindle and the die is carried by said horizontal spindle.
3. Apparatus as defined in claim 1 in which the pinion is a hypoid gear pinion and is carried by said horizontal spindle and the die is carried by said vertical spindle.
4. Apparatus as defined in claim 1 in which the drive means is connected to said horizontal spindle.
5. Apparatus as defined in claim 1 in which the drive means is connected to said vertical spindle.
6. Apparatus as defined in claim 1 in which said rotary drive means comprises a motor carried by said horizontal slide.
7. Appaartus as defined in claim 1 in which said feed means comprises a hydraulic piston and cylinder device.
8. Apparatus as defined in claim 6 in which said feed means comprises a hydraulic piston and cylinder device.
9. Apparatus as defined in claim 1 comprising a stop for limiting upward movement of said work slide.
10. Apparatus as defined in claim 1 in which said drive means comprises a motor mounted on said vertically movable slide and connected to said vertical spindle.
11. Apparatus as defined in claim 1 in which said frame comprises a base plate, laterally spaced side plates, and a top plate connecting the tops of said side plates, said horizontally movable slide being suspended from said top plate, and said vertically movable slide is connected by ways to said side plates.

References Cited

UNITED STATES PATENTS

| 1,240,914 | 9/1917 | Anderson | 72—84 |
| 1,240,918 | 9/1917 | Anderson | 72—109 |
| 1,669,818 | 5/1928 | Gleason et al. | 72—84 |

RICHARD J. HERBST, Primary Examiner

U.S. Cl. X.R.

72—86, 102; 29—159.2